US012335986B2

(12) United States Patent
Lin et al.

(10) Patent No.: US 12,335,986 B2
(45) Date of Patent: Jun. 17, 2025

(54) CORESET FREQUENCY RESOURCE CONFIGURATION FOR WIDE-BAND OPERATION IN NR-U (71) Applicant: SAMSUNG ELECTRONICS CO., LTD., Suwon-si (KR)

(72) Inventors: Hsien-Ping Lin, San Diego, CA (US); Jung Hyun Bae, San Diego, CA (US); Jungmin Park, Seoul (KR)

(73) Assignee: Samsung Electronics Co., Ltd., Yongin-si (KR)

(*) Notice: Subject to any disclaimer, the term of this patent is extended or adjusted under 35 U.S.C. 154(b) by 233 days.

(21) Appl. No.: 17/028,804

(22) Filed: Sep. 22, 2020

(65) Prior Publication Data
US 2021/0314950 A1    Oct. 7, 2021

Related U.S. Application Data (60) Provisional application No. 63/004,941, filed on Apr. 3, 2020.

(51) Int. Cl.
*H04W 72/53* (2023.01)
*H04W 24/08* (2009.01)
*H04W 72/0453* (2023.01)
*H04W 72/23* (2023.01)

(52) U.S. Cl.
CPC ........... *H04W 72/53* (2023.01); *H04W 24/08* (2013.01); *H04W 72/0453* (2013.01); *H04W 72/23* (2023.01)

(58) Field of Classification Search
CPC ............. H04W 72/0453; H04W 48/12; H04W 72/0493; H04W 24/08; H04W 72/042;
(Continued)

(56) References Cited

U.S. PATENT DOCUMENTS

2019/0089486 A1* 3/2019 Kim .................. H04L 5/0091
2019/0222391 A1* 7/2019 Lee .................. H04L 5/0053
(Continued)

FOREIGN PATENT DOCUMENTS

CN      110351041 A    10/2019
CN      111093270 A     5/2020
WO  WO 2020/032774 A1  2/2020

OTHER PUBLICATIONS

Nokia et al.: "On wideband operation in NR-U," R1-1912280, 3rd Generation Partnership Project (3GPP), 2019, 11 pages, Retrieved from the Internet: URL:https://ftp.3gpp.org/tsg_ran/WG1_RL1/TSGR1_99/Docs/R1-1912280.zip [retrieved on Nov. 8, 2019].
(Continued)

*Primary Examiner* — Yee F Lam
(74) *Attorney, Agent, or Firm* — Lewis Roca Rothgerber Christie LLP (57) ABSTRACT Provided is a method of network communication for addressing a misalignment of a CORESET resource allocation with a first RB set due to varying RB set size, the method including determining a CORESET configuration, a search space set configuration, and/or an RB set configuration, determining the search space set configuration includes multiple frequency domain monitoring occasions, identifying a CORESET resource in each of the frequency domain monitoring occasions, determining the CORESET resource is only partially confined within the first RB set, and adjusting a PDCCH-monitoring protocol to improve performance of the CORESET resource.

9 Claims, 5 Drawing Sheets (58) Field of Classification Search
CPC ... H04L 5/0053; H04L 5/0007; H04L 1/0068; H04L 5/001; H04L 5/0094; H04L 5/0005
See application file for complete search history.

(56) References Cited

U.S. PATENT DOCUMENTS

| | | | |
|---|---|---|---|
| 2019/0335488 A1 | 10/2019 | Xiong et al. | |
| 2019/0342030 A1* | 11/2019 | Hosseini | H04W 72/1268 |
| 2019/0372730 A1* | 12/2019 | Zhang | H04L 5/0044 |
| 2020/0280971 A1* | 9/2020 | Moon | H04L 5/0094 |
| 2021/0250953 A1* | 8/2021 | Sun | H04W 72/0453 |

OTHER PUBLICATIONS

LG Electronics: "Summary #2 on wide-band operation for NR-U," R1-1913543, 3rd Generation Partnership Project (3GPP), 2019, 23 pages, Retrieved from the Internet: URL:https://ftp.3gpp.org/tsg_ran/WG1_RL1/TSGR1_99/Docs/R1-1913543.zip [retrieved on Nov. 25, 2019].

LG Electronics: "Summary #2 on maintenance of wide-band operation for NR-U," R1-2001163, 3rd Generation Partnership Project (3GPP), 2020, 38 pages, Retrieved from the Internet: URL:https://ftp.3gpp.org/tsg_ran/WG1_RL1/TSGR1_100_e/Docs/R1-2001163.zip [retrieved on Feb. 22, 2020].

EPO Extended European Search Report dated Jun. 23, 2021, issued in corresponding European Patent Application No. 20217984.2 (11 pages).

European Search Report for EP Application No. 23190331.1 dated Oct. 23, 2023, 11 pages.

Nokia et al. "Remaining issues on WB operation in NR-U", 3GPP TSG RAN WG1 Meeting #100e, retrieved from https://ftp.3gpp.org/tsg_ran/WG1_RL1/TSGRI_I00_e/Docs/RI-2000502.zip, Feb. 14, 2020, 11 pages.

* cited by examiner

CORESET FREQUENCY RESOURCE CONFIGURATION FOR WIDE-BAND OPERATION IN NR-U

CROSS-REFERENCE TO RELATED APPLICATION(S)

This application claims priority to, and the benefit of, U.S. Provisional Application Ser. No. 63/004,941, filed Apr. 3, 2020, entitled CORESET FREQUENCY RESOURCE CONFIGURATION FOR WIDE-BAND OPERATION IN NR-U, the entire contents of which is incorporated herein by reference.

FIELD

Aspects of some embodiments of the present disclosure relate to network communication, and methods of monitoring downlink control signaling.

BACKGROUND

A base station (e.g., an E-UTRAN (Evolved Universal Terrestrial Radio Access Network) Node B, also known as Evolved Node B or eNodeB) may communicate with multiple UEs at any given point in time. That is, the base station may function as the hardware that is connected to a mobile phone network, and that communicates directly and wirelessly with mobile handsets (e.g., a user equipment, also referred to as a UE) or transceivers in the network.

The base station may communicate with multiple UEs, although it may be noted that high communication traffic may potentially degrade UE performance. To enable the base station to handle multiple communications by multiple UEs, the UEs may be variously configured to communicate with the base station in a manner to avoid interference with the communications of other UEs.

For example, a UE may monitor signaling (e.g., downlink control signals containing downlink control information (DCI)) from the base station. That is, the UE may be configured in a time domain (e.g., may have a search space set configuration) and in a frequency domain (e.g., may have a control resource set (CORESET) configuration). Accordingly, multiple UEs may monitor a physical downlink control channel (PDCCH) in a serving cell including the base station at respective times in the time domain while operating while using respective frequencies/frequency bands in the frequency domain.

The CORESET is a set of time/frequency resources where the PDCCH can be transmitted to a respective UE. The CORESET may be semi-statically configured by the network connected to the base station. Also, there can be many CORESETs in a single carrier corresponding to the UE, and the CORESETs may occur anywhere in a given slot and in the frequency range of the carrier. However, the CORESETs may generally have a maximum length of three (3) symbols.

Accordingly, a CORESET indicates the time that a corresponding UE may reserve to search for control information from the base station. By using both search space set and CORESET configurations, the UE can know what frequencies or frequency band(s) to use in monitoring downlink control signals, and at which point(s) in time to monitor for the downlink control signal.

SUMMARY

Aspects of embodiments of the present disclosure relate to network communication, and provide improvements to wide-band operations in the New Radio Unlicensed Spectrum (NR-U).

According to some embodiments of the present disclosure, there is provided a method of network communication for addressing a misalignment of a CORESET resource allocation with a first RB set due to varying RB set size, the method including determining a CORESET configuration, a search space set configuration, and/or an RB set configuration, determining the search space set configuration includes multiple frequency domain monitoring occasions, identifying a CORESET resource in each of the frequency domain monitoring occasions, determining the CORESET resource is only partially confined within the first RB set, and adjusting a PDCCH-monitoring protocol to improve performance of the CORESET resource.

The CORESET resource in each of the frequency domain monitoring occasions may be based on a size of a zeroth RB set.

The method may further include determining a CORESET configuration and/or an RB set configuration, and determining an absence of new restrictions on the CORESET configuration and/or the RB set configuration.

The adjusting the PDCCH-monitoring protocol may include ignoring a PDCCH candidate of the CORESET resource, the PDCCH candidate being only partially confined within the first RB set.

The adjusting the PDCCH-monitoring protocol may include rate-matching a PDCCH candidate of the CORESET resource, the PDCCH candidate being only partially confined within the first RB set.

The adjusting the PDCCH-monitoring protocol may include modifying the CORESET resource to be within the first RB set.

The adjusting the PDCCH-monitoring protocol may include ignoring the CORESET resource allocation that is not within an RB set.

The method may further include determining a CORESET configuration and an RB set configuration, and ensuring the CORESET configuration is applicable to the RB set configuration.

According to other embodiments of the present disclosure, there is provided a communication device for performing a method of network communication for addressing a misalignment of a CORESET resource allocation with a first RB set due to varying RB set size, the communication device being configured to determine a CORESET configuration, a search space set configuration, and/or an RB set configuration, determine the search space set configuration includes multiple frequency domain monitoring occasions, identify a CORESET resource in each of the frequency domain monitoring occasions, determine the CORESET resource is only partially confined within the first RB set, and adjust a PDCCH-monitoring protocol to improve performance of the CORESET resource.

The CORESET resource in each of the frequency domain monitoring occasions may be based on a size of a zeroth RB set.

The communication device may be further configured to determine a CORESET configuration and/or an RB set configuration, and determine an absence of new restrictions on the CORESET configuration and/or the RB set configuration.

The communication device may be configured to adjust the PDCCH-monitoring protocol by ignoring a PDCCH candidate of the CORESET resource, the PDCCH candidate being only partially confined within the first RB set.

The communication device may be configured to adjust the PDCCH-monitoring protocol by rate-matching a PDCCH candidate of the CORESET resource, the PDCCH candidate being only partially confined within the first RB set.

The communication device may be configured to adjust the PDCCH-monitoring protocol by modifying the CORESET resource to be within the first RB set.

The communication device may be configured to adjust the PDCCH-monitoring protocol by ignoring the CORESET resource allocation that is not within an RB set.

The communication device may be further configured to determine a CORESET configuration and an RB set configuration, and ensure the CORESET configuration is applicable to the RB set configuration.

According to other embodiments of the present disclosure, there is provided a non-transitory computer readable medium implemented with a user equipment for communicating with a base station, the non-transitory computer readable medium having computer code that, when executed on a processor, implements a method of network communication for addressing a misalignment of a CORESET resource allocation with a first RB set due to varying RB set size, the method including determining a CORESET configuration, a search space set configuration, and/or an RB set configuration, determining the search space set configuration includes multiple frequency domain monitoring occasions, identifying a CORESET resource in each of the frequency domain monitoring occasions, determining the CORESET resource is only partially confined within the first RB set, and adjusting a PDCCH-monitoring protocol to improve performance of the CORESET resource.

The CORESET resource in each of the frequency domain monitoring occasions may be based on a size of a zeroth RB set.

The computer code, when executed on the processor, may further implement the method by determining a CORESET configuration and/or an RB set configuration, and determining an absence of new restrictions on the CORESET configuration and/or the RB set configuration.

The computer code, when executed on the processor, may further implement the method by determining a CORESET configuration and an RB set configuration, and ensuring the CORESET configuration is applicable to the RB set configuration.

Accordingly, embodiments of the present disclosure improve improvements to wide-band operations in NR-U by providing improved methods for handling a CORESET resource allocation, or a PDCCH candidate of the CORESET resource allocation, that is not located entirely within a single RB set.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, a user equipment (UE) may be provided with a search space set configuration, and a control resource set (CORESET) configuration, to enable the UE to monitor downlink control information (DCI) in a physical downlink control channel (PDCCH) from a base station (e.g., an eNodeB) in a serving cell.

The search space set configuration enables the UE to perform PDCCH-monitoring of occasion information in the time domain (e.g., enables the UE to know when the UE should monitor DCI). The CORESET configuration provides information to enable the UE to perform PDCCH-monitoring in the frequency domain (e.g., enables the UE to know which frequencies/frequency band(s) the UE should use to monitor DCI).

Accordingly, the search space set configuration provides PDCCH-monitoring of occasion information in the time domain, and each PDCCH-monitoring occasion is associated with the CORESET configuration that is linked to the search space set configuration.

The CORESET configuration may provide a set of resource blocks (RBs), and may also provide a symbol duration for monitoring PDCCH candidates. For example, a CORESET frequency domain resource may be indicated by a bitmap in the frequency domain. The bits of the bitmap may have a one-to-one mapping with consecutive, non-overlapping groups of RBs within the bandwidth of the downlink (DL) bandwidth part (BWP). Each group of RBs may have six (6) physical resource blocks (PRBs).

Accordingly, by receiving information in the form of the CORESET configuration from the base station, the UE need not monitor an entirety of a corresponding bandwidth (e.g., need not monitor an entire bandwidth of the New Radio Unlicensed Spectrum (NR-U), but may instead monitor only a part thereof (e.g., may monitor only the corresponding BWP, as may be determined by the CORESET configuration).

When an offset that is configured by a base station (e.g., a RB-Offset-r16, "r16" referring to Release 16 standards, and "RB-Offset-r16" referring to an existing Release 16 Radio Resource Control (RRC) parameter) is not provided, the first group of six (6) physical resource blocks (PRBs) within the DL BWP corresponding to the first bit of the bitmap may begin with a common RB index "$6 \cdot [N_{BWP}^{start}/6]$." However, when a common RB index "$N_{BWP}^{start}+N_{RB}^{offset}$" is provided ($N_{RB}^{offset}$ being provided by RB-Offset-r16), the first bit corresponding to $N_{BWP}^{start}+N_{RB}^{offset}$ when $N_{RB}^{offset}$ is provided, $N_{BWP}^{start}$ may correspond to a first common RB index of the DL BWP, and RB-Offset-r16 may be an offset that is configured by a base station for communicating with the UE.

Further, a PDCCH candidate within a CORESET resource allocation may include a set of control channel elements (CCEs) that depend on a corresponding aggregation level. A CCE may include six (6) resource element groups (REGs). Each REG may be a group of twelve (12) consecutive resource elements (REs). Accordingly, a UE may monitor a set of REs for PDCCH candidates that are located in the corresponding time and frequency domains based on the CORESET and search space set configurations.

However, for UEs operating in NR-U (NR-U being the unlicensed spectrum wherein Wi-Fi, and anything else, can operate, thereby making coordination with various UEs more complicated) a carrier bandwidth part (BWP), which is larger than the sub-band bandwidth for single-channel-sensing, might not be fully utilized for transmission due to unpredictable channel-sensing outcomes. Because the BWP in NR-U is relatively very large, when channel-sensing is performed, the UE may segment the relative BWP (e.g., having a bandwidth of about 80 MHZ) into individual units or sections (e.g., into four 20 MHz sections) with one or more of the sections being unavailable or occupied. For example, if the BWP is large, it may not be fully utilized for transmission.

Accordingly, UEs seeking to transmit information may have added difficulty in NR-U. For example, because of the possible presence of multiple UEs, the UE might not be guaranteed to be able to transmit at every time desired. Thus, every UE may perform channel-sensing to determine whether a given channel is idle or not. When the channel is idle, the UE may transmit information to the base station.

The available RBs for transmission in one sub-band bandwidth (a unit for channel-sensing) may be referred to as RB set, and each RB set within a BWP may identified by an index that begins at 0. Accordingly, the available resources may all be coded in the sub-band bandwidth as an RB set.

Further, the UE might not be required to monitor a PDCCH candidate that overlaps with any RB from the RB sets that are indicated as being unavailable RB sets, as indicated by a received Downlink Control Information (DCI) format (e.g., DCI 2_0).

When there are several RB sets (e.g., when there are several monitoring locations, the CORESET resource may be configured within each RB set. As mentioned above, a bitmap may be used for each RB set. To simplify the configuration of the CORESET for the feature of multiple frequency-domain-monitoring locations, the CORESET frequency domain resource bitmap may be reinterpreted. For example, the CORESET frequency domain may be represented by a bitmap, which has one-to-one mapping for six (6) consecutive RBs. Accordingly, the UE may avoid monitoring all of the bandwidth, and instead may monitor only the relevant BWP.

For example, the CORESET frequency domain resource allocation may be determined by a first number of bits "$N_{RBG,set0}^{size}$" of a frequency resource bitmap, where $N_{RBG,set0}^{size} = \lfloor N_{RB,set0}^{size} - N_{RB}^{offset})/6 \rfloor$, where $N_{RB,set0}^{size}$ corresponds to a number of available RBs in the RB set 0 (e.g., the zeroth/0$^{th}$ RB set) of the BWP, and where $N_{RB}^{offset}$ is provided by a higher layer parameter RB-offset or $N_{RB}^{offset}=0$ when no RB-offset is provided.

For the zeroth RB set, each bit of the frequency resource bitmap has a one-to-one mapping with non-overlapping groups of six (6) consecutive RBs, in ascending order of the RB index in the downlink (DL) BWP with beginning/starting common RB index "$N_{BWP}^{start}$" where the first common RB of the first group of six (6) RBs has a common RB index $N_{BWP}^{start}+N_{RB}^{offset}$.

If a CORESET configuration is assigned by the base station to the UE, then the UE may be aware of the range of the frequency. The range of the frequency in the frequency domain may be mapped to an RB index, as described above, where the first bit of the CORESET configuration bitmap may map to the PRB index, with $N_{BWP}^{start}$ indicating a start point (e.g., a lowest available frequency associated with the CORESET configuration).

That is, the first bits $N_{RBG,set0}^{size}$ corresponding to the number of available RBs in the RB set may be utilized to determine the CORESET resource allocation in all RB sets in the BWP. The CORESET resource allocation may be determined by linking the first bit to the six (6) RBs, which include the first RB that is to be set as the common RB. The six (6) RBs may have an index "$N_{RB,set\ k}^{start}+N_{RB}^{offset}$" in the frequency domain monitoring location that is confined within an RB set (e.g., RB set k), where $N_{RB,set\ k}^{start}$ is the index of first RB of the RB set k.

Figure 1:
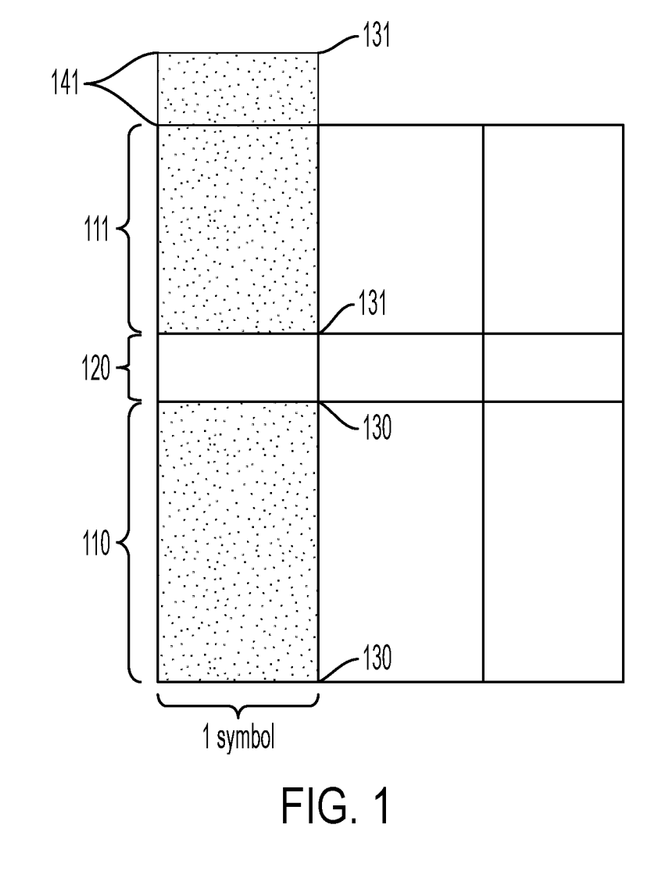
FIG. 1 is a block diagram depicting an example of a CORESET resource allocation issue that may occur when different RB sets have different sizes, according to some embodiments of the present disclosure.

FIG. 1 is a block diagram depicting an example of a CORESET resource allocation issue that may occur when different RB sets have different sizes, according to some embodiments of the present disclosure.

Referring to FIG. 1, for a CORESET that spans multiple RB sets (e.g., RB set 0/zeroth RB set 110 and RB set 1/first RB set 111), there may exist one or more PDCCH candidate that is not be confined within a single RB set. That is, one or more PDCCH candidates might cross several RB sets.

Similar CORESET frequency domain resource allocations may be applied to multiple RB sets. For example, a UE may copy a common CORESET resource (e.g., CORESET resource allocations 130, 131) in the different RB sets 110, 111. However, although the CORESET may occupy all of the zeroth RB set 110, the first RB set 111 may be smaller than the zeroth RB set 110, causing the CORESET resource allocation 131 to be less than entirely within the first RB set 111. Further, less than all of the RB sets may be available for use.

Accordingly, it may be useful for the PDCCH candidate to be punctured (e.g., to truncate, or erase, a portion of the PDCCH candidate). A UE might detect a punctured PDCCH candidate when any of the associated RB sets are not available from the channel-sensing outcome. However, use of the punctured PDCCH by the UE may be undesirable in terms of PDCCH-decoding performance, due to potential loss of information during data transmission. For example, the UE might not be aware of which particular portion of the PDCCH is erased, which may negatively affect decoding.

Issues resulting from a punctured PDCCH may be addressed by including multiple frequency-domain-monitoring locations of the CORESET in a search space set configuration, such that each CORESET-monitoring location in the frequency domain is associated with a CORESET in an RB set that is for wideband operation. Accordingly, a PDCCH candidate may be completely detected within a single RB set when the associated sensing of the channel is successful and the RB set is available.

Due to configurability of the size of RB sets and of the $N_{RB}^{offset}$ portion of the index, the number of available RBs in a zeroth/0$^{th}$ RB set (e.g., RB set 0) 110 may be different from the number of available RBs in other RB sets (e.g., RB set 1/a first RB set 111). As an example, the first RB set 111 may include 52 RBs, and may be separated from the zeroth RB set including 54 RBs by a guard band 120 having a size of four (4) RBs.

Consequently, the CORESET resource allocation 131 for the first RB set 111 (as well as other RB sets that are other than the zeroth RB set 110) might not be confined within the first RB set 111 when the CORESET resource is determined based on the first bits ($N_{RBG,set0}^{size}$) of the frequency resource bitmap, even though the CORESET resource allocation 130 for the zeroth RB set 110 is entirely confined therein.

For example, if an $i^{th}$ RB set (e.g., RB set i), such as the first RB set 111, has many fewer RBs than the zeroth RB set 110 due to configurations thereof, then a CORESET resource (e.g., the CORESET resource allocation 131 of the first RB set 111) that corresponds to the first bits ($N_{RBG,set0}^{size}$) of the frequency resource bitmap may exceed the $i^{th}$ RB set. The manner in which a UE should interpret the part(s) of CORESET resource allocation that are not confined within the $i^{th}$ RB set (e.g., the manner in which a UE should interpret the portions 141 of the CORESET resource allocation 131 that are not confined within the first RB set 111) is not generally specified.

Accordingly, FIGS. 2-4, described below, provide various methods for handling the scenario described above with respect to FIG. 1.

Figure 2:
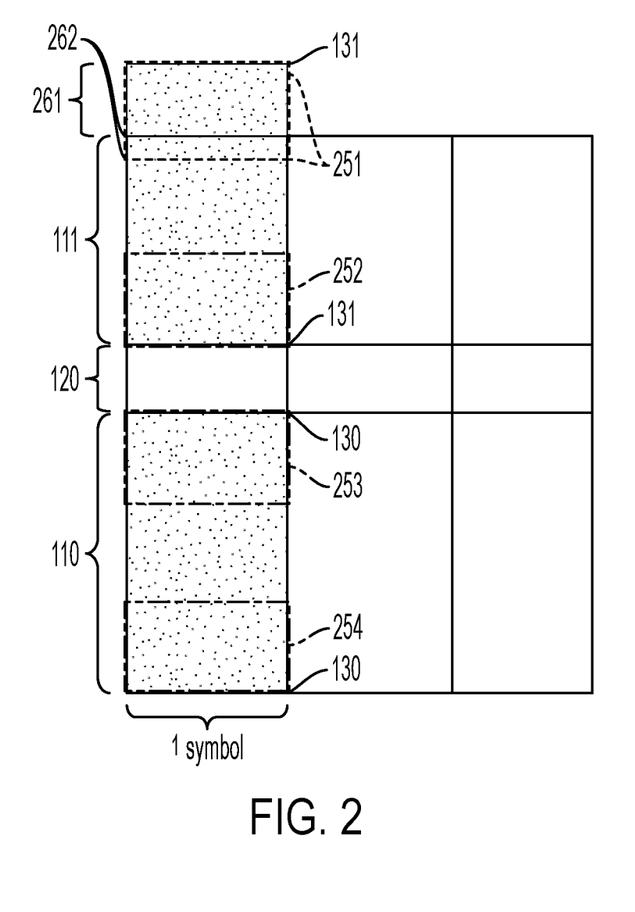
FIG. 2, is a block diagram depicting an example of a punctured PDCCH candidate when RB sets have different sizes, wherein the punctured PDCCH candidate may be ignored, according to some embodiments of the present disclosure.

FIG. 2, is a block diagram depicting an example of a punctured PDCCH candidate when RB sets have different sizes, wherein the punctured PDCCH candidate may be ignored, according to some embodiments of the present disclosure.

Referring to FIG. 2, to address the issue outlined above with respect to FIG. 1, a UE can follow a same PDCCH-monitoring procedure based on a PDCCH-monitoring configuration regardless of whether a monitored PDCCH candidate is within (e.g., entirely within) a given RB set or not.

Consequently, a UE might detect a punctured PDCCH candidate when any of part of the PDCCH candidate is not within a corresponding RB set. For example, a UE might detect punctured PDCCH candidate 251 that includes both a portion 262 included within the first RB set 111, and a punctured portion 261 not included within the first RB set 111. Other PDCCH candidates 252, 253, 254 that are not punctured may be found in their respective RB sets 110, 111.

As described above, use of a punctured PDCCH candidate 251 may decrease performance of PDCCH-decoding operations. Accordingly, according to some embodiments of the present disclosure, a UE may determine a mapping of PDCCH candidates corresponding to a configured RB set. The PDCCH-candidate mapping may be based on the first number of bits $N_{RBG,set0}^{size}$ of the frequency resource bitmap provided by the CORESET configuration.

The UE may ignore the PDCCH candidates that are not fully overlapped with the RB set (e.g., the PDCCH candidate 251) due to the RB set size misalignment. In this case, the PDCCH-candidate mapping may be the same in all of the RB sets 110, 111, but a number of PDCCH candidates that the UE processes in each RB set might be different. For example, the UE may only process PDCCH candidates 252, 253, and 254. Alternatively, however, the UE may instead ignore an entirety of the CORESET resource allocation 131 containing the punctured PDCCH candidate 251, including non-punctured PDCCH candidate 252 therein, while processing only the PDCCH candidates 253, 254 of the CORESET resource allocation 130 that contains no punctured PDCCH candidates. That is, a simpler UE behavior may entirely ignore any CORESET resource allocation that is not confined within an RB set, and may instead only monitor the RB sets where the configured CORESET resource allocation fully overlaps the corresponding RB set.

Figure 3:
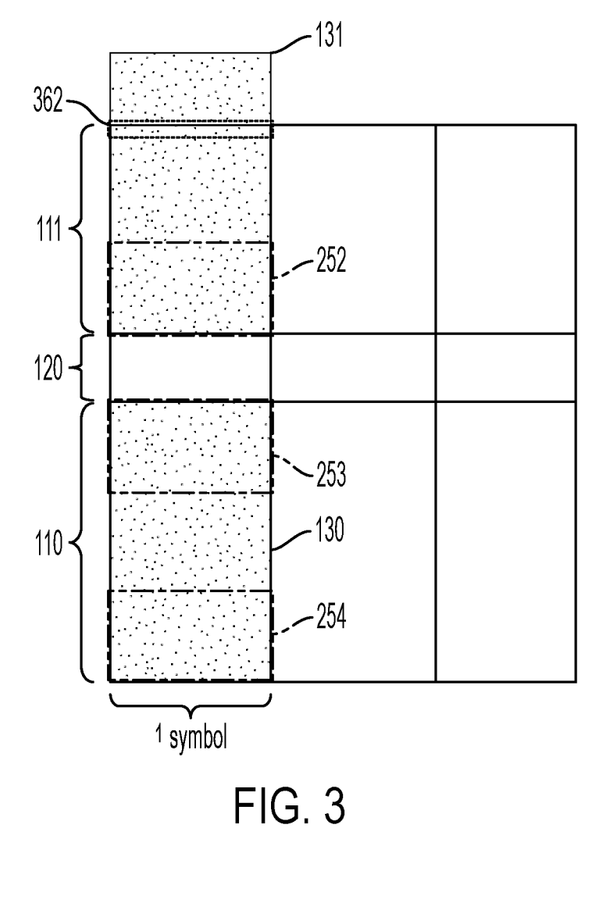
FIG. 3, is a block diagram depicting an example of rate-matching a PDCCH candidate when RB sets have different sizes, according to some embodiments of the present disclosure.

FIG. 3, is a block diagram depicting an example of rate-matching a PDCCH candidate when RB sets have different sizes, according to some embodiments of the present disclosure.

Referring to FIG. 3, to keep a same number of PDCCH candidates in each of the RB sets, and to avoid puncturing a PDCCH candidate, a base station may perform rate-matching, such that an otherwise punctured PDCCH candidate (e.g., PDCCH candidate 251 of FIG. 2) is reduced in size, but remains entirely within the corresponding RB set (e.g., the PDCCH candidate 362 within the first RB set 111). Rate-matching may allow slightly better performance than puncturing a PDCCH candidate, as the UE might not have to deal with as much noise/interference.

It should be noted that, when a base station wants to transmit some information (e.g., upload a file), the transmission procedure may incur some noise. Accordingly, the base station might not blindly transmit data corresponding to the file without any protection to avoid corruption of the data, as the receiver may receive the file with some noise. To avoid potential corruption of the data, the base station might not simply transmit the file alone, but may also add some redundancy of the information contained in the file to reduce effects otherwise caused by noise. Accordingly, what is transmitted by the base station may be larger than the file size. For example, if a code rate is relatively very low (e.g., 1/10), then the base station may transmit 10 mb worth of data for 1 mb file. Meanwhile, it may be noted that a large code rate provides for less protection against noise. Accordingly, it may be suitable to use resources (e.g., RBs) to the extent possible to prevent code rate from being too low.

Accordingly, a UE, which is aware that the base station is capable of performing rate-matching, may perform decoding, and may decode an entirety of the PDCCH candidate 362, although the code rate may be relatively very high. The UE may determine the PDCCH-candidate mapping in a configured RB set based on the first bits $N_{RBG,set0}^{size}$ of the frequency resource bitmap provided by the CORESET configuration. Accordingly, the UE may rate-match a PDCCH candidate if any of the resources are not in the RB set.

Figure 4:
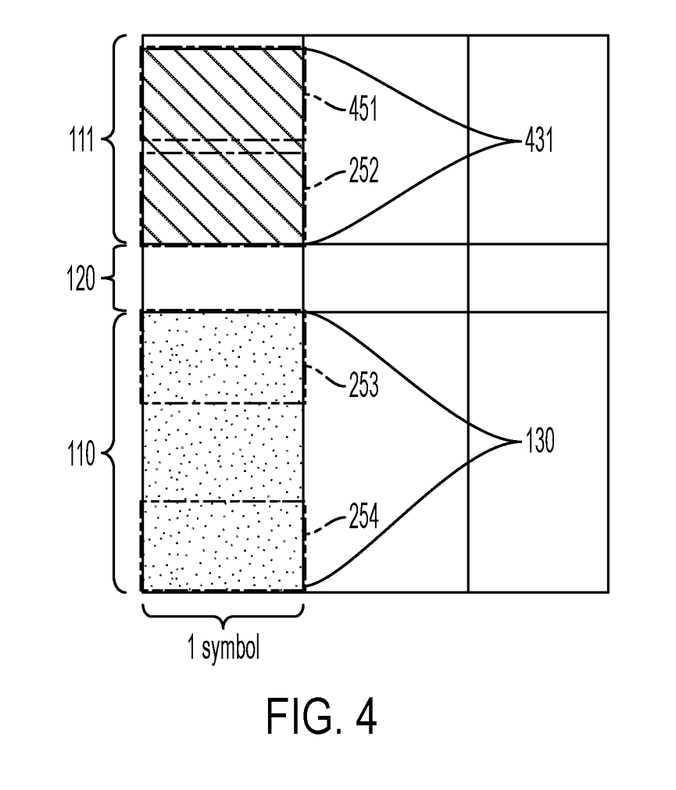
FIG. 4, is a block diagram depicting an example of adjusting a CORESET resource configuration when RB sets have different sizes, according to some embodiments of the present disclosure.

FIG. 4, is a block diagram depicting an example of adjusting a CORESET resource configuration when RB sets have different sizes, according to some embodiments of the present disclosure.

Referring to FIG. 4, according to other embodiment of the present disclosure, it may be possible to resolve issues that may result from the presence of a punctured PDCCH candidate by having a UE ignore the portion of the CORESET resource allocation that is not confined within an RB set (e.g., the UE may ignore the punctured portion 261 shown in FIG. 2). That is, the UE may use CORESET resource allocations 431, 130 of different sizes. Within the smaller CORESET resource allocation 431, the locations of the PDCCH candidates 451, 252 may be redefined (e.g., from the PDCCH candidates 251, 251 shown in FIG. 2).

That is, the UE may ignore the punctured portion 261 of the punctured PDCCH candidate 251 corresponding to the CORESET resource allocation 131 (shown in FIG. 2). As a result, the UE may detect two non-punctured PDCCH candidates 451 and 252 in the first RB set 111. It may be noted that by ignoring the punctured portion 261 of the PDCCH candidate 251, and by instead recognizing non-punctured PDCCH candidate 451, the CORESET resource allocation 431 of FIG. 4 is smaller than the CORESET resource allocation 231 of FIG. 2. It may be noted that the PDCCH candidates 451 and 252 of the first RB set 111 of FIG. 4 may have fewer RBs therebetween than the PDCCH candidates 251 and 252 of the first RB set 111 of FIG. 2.

Accordingly, CORESET resource allocation can be different in those of the RB sets (e.g., the first RB set 111) that have fewer RBs than the zeroth RB set 110, and the associated PDCCH-candidate mapping may be changed accordingly.

It should be noted that, in other embodiments, punctured PDCCH candidates may be avoided by network configuration ensuring the first $N_{RBG,set0}^{size}$ bits of the frequency resource bitmap can be applied to all RB sets. For example, all RB sets may have the same available RBs, or the zeroth RB set may have the smallest number of available RBs among all of the RB sets, such that establishing the size of the CORESET resource allocation based on the size of the zeroth RB set ensures that copies of the CORESET resource allocation fit entirely within any of the RB sets, as the CORESET resource allocation is small enough to fit in all RB sets of varying sizes, which may be adopted in 5G standards. That is, if a UE is provided with RB sets in the DL BWP, the UE may handle the RBs of the CORESET as being within the union of the PRBs in the RB sets of the DL BWP. Accordingly, although UE implementation complexity is not impacted, base station configuration flexibility is compromised by CORESET configuration restriction or RB set configuration restriction. Such embodiments may introduce new UE behavior on PDCCH-monitoring and PDCCH processing, and potential UE implementation complexity may be considered accordingly.

Figure 5:
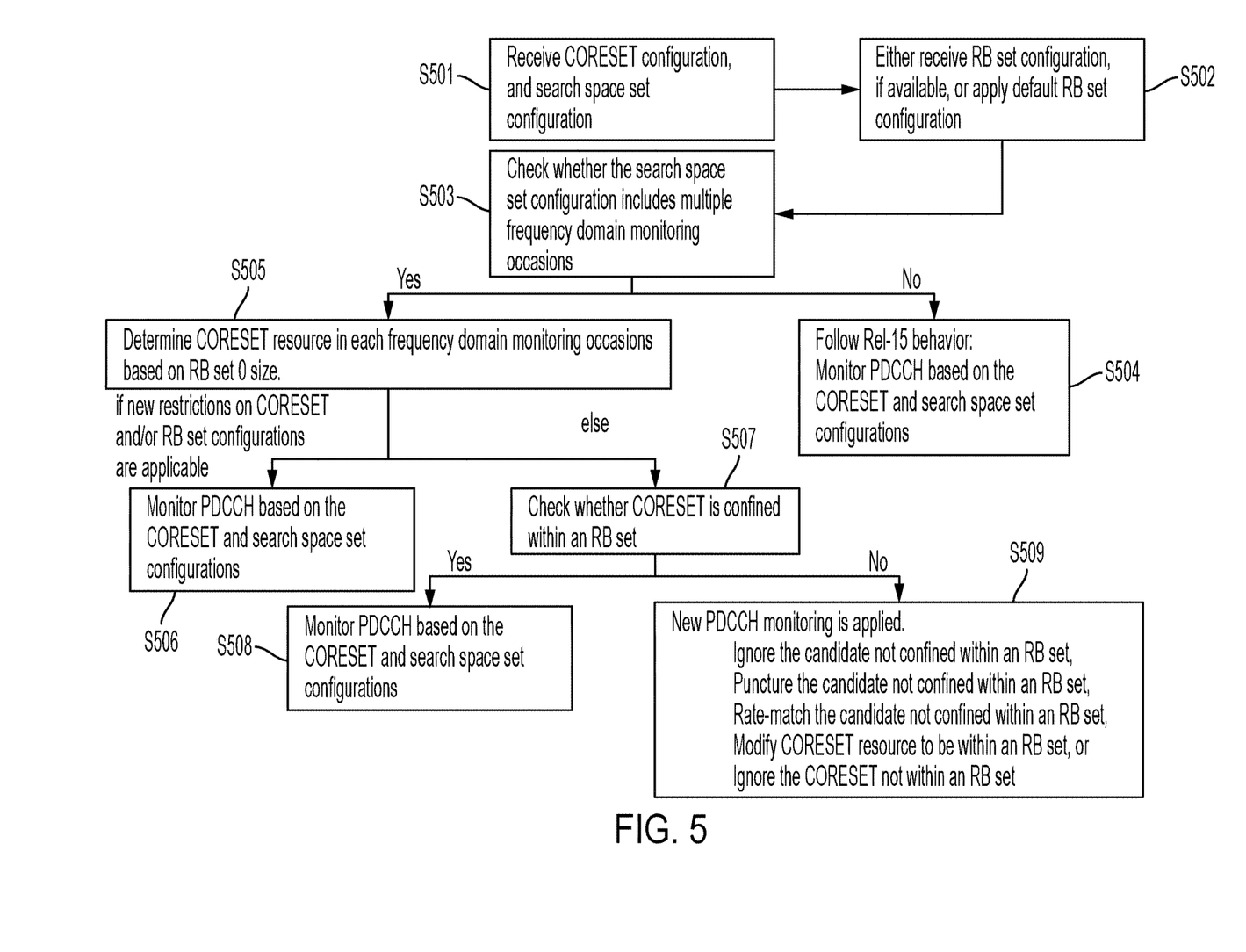
FIG. 5 is a flowchart depicting a method of network communication, according to some embodiments of the present disclosure.

FIG. 5 is a flowchart depicting a method of network communication, according to some embodiments of the present disclosure.

Referring to FIG. 5, at S501, a UE may receive (e.g., from a base station) CORESET and search space set configurations.

At S502, the UE may either receive (e.g., from the base station) an RB set configuration (if one is available), or may apply a default RB set configuration.

At S503, the UE may check to determine whether the search space set configuration includes multiple frequency domain monitoring occasions.

If not (No), at S504, the UE may operate in accordance with a previously decided protocol (e.g., Rel-15), and may monitor the PDCCH based on the received CORESET and search space set configurations.

If it is determined at S503 that the search space set configuration includes multiple frequency domain monitoring occasions (Yes), at S505, the UE may determine a CORESET resource in each of the frequency domain monitoring occasions based on a size of a zeroth RB set.

At S506, the UE may determine that new restrictions on the CORESET and/or RB set configurations are applicable, and may monitor PDCCH based on the CORESET and search space set configurations in accordance with the new restrictions. For example, a CORESET resource configuration may be ensured by the base station to be applicable to all of the configured RB sets.

Otherwise, if no new restrictions on the CORESET and/or RB set configurations are applicable (else), at S507, the UE may determine whether a CORESET is confined within any RB set.

If there exists a CORESET that is entirely confined within an RB set (Yes), at S508, the UE may monitor the PDCCH based on the CORESET and search space set configurations.

However, if there is a CORESET that is punctured (No), at S509, the UE may apply a new PDCCH-monitoring scheme in accordance with FIGS. 2-4 above.

For example, the UE may ignore the PDCCH candidate that is not confined within an RB set (e.g., see FIG. 2) or may ignore the entire CORESET that is not entirely within an RB set, the UE may puncture the PDCCH candidate that is not confined within an RB set (at the risk of increased noise associated with that PDCCH candidate), the UE may use a rate-matched candidate (e.g., rate-matched by the base station) that is not confined within an RB set (e.g., see FIG. 3), or the UE may modify the CORESET resource to be within an RB set (e.g., see FIG. 4).

Accordingly, embodiments of the present disclosure provide improvements to network communication by providing methods for handling issues that may otherwise arise due to the presence of a punctured PDCCH candidate.

While embodiments of the present disclosure have been particularly shown and described with reference to the accompanying drawings, the specific terms used herein are only for the purpose of describing the invention and are not intended to define the meanings thereof or be limiting of the scope of the invention set forth in the claims. Therefore, those skilled in the art will understand that various modifications and other equivalent embodiments of the present disclosure are possible. Consequently, the true technical protective scope of the present disclosure must be determined based on the technical spirit of the appended claims, with functional equivalents thereof to be included therein.

What is claimed is:

1. A method of network communication for preventing a misalignment of a control resource set (CORESET) resource allocation for a resource block (RB) set, the method comprising:
   identifying RB sets for a user equipment (UE);
   determining that an RB set of the RB sets has a smallest number of available RBs among the RB sets; and
   in response to determining that the RB set of the RB sets has the smallest number of available RBs among the RB sets:
      determining a CORESET resource allocation that fits entirely within the RB set of the RB sets that has the smallest number of available RBs; and
      configuring the UE with a CORESET that includes one or more copies of the CORESET resource allocation.

2. The method of claim 1, wherein determining the RB set of the RB sets has the smallest number of available RBs comprises identifying a zeroth RB set of the RB sets.

3. The method of claim 1, wherein a size of a CORESET resource in a frequency domain monitoring occasion is equal to a size of a zeroth RB set.

4. A communication device comprising:
   a processor; and
   memory,
   wherein the processor is configured to:
      identify RB sets for a user equipment (UE);
      determine that an RB set of the RB sets has a smallest number of available RBs among the RB sets; and
      in response to determining that the RB set of the RB sets has the smallest number of available RBs among the RB sets:
         determine a CORESET resource allocation that fits entirely within the RB set of the RB sets that has the smallest number of available RBs; and
         configure the UE with a CORESET that includes one or more copies of the CORESET resource allocation.

5. The communication device of claim 4, wherein determining the RB set of the RB sets has the smallest number of available RBs comprises identifying a zeroth RB set of the RB sets.

6. The communication device of claim 4, wherein a size of a CORESET resource in a frequency domain monitoring occasion is equal to a size of a zeroth RB set.

7. A non-transitory computer readable medium implemented with a user equipment for communicating with a base station, the non-transitory computer readable medium having computer code that implements a method of network communication for preventing a misalignment of a control resource set (CORESET) resource allocation for a resource block (RB) set, the method comprising:
   identifying RB sets for a user equipment (UE);
   determining that an RB set of the RB sets has a smallest number of available RBs among the RB sets; and
   in response to determining that the RB set of the RB sets has the smallest number of available RBs among the RB sets:
      determining a CORESET resource allocation that fits entirely within the RB set of the RB sets that has the smallest number of available RBs; and
      configuring the UE with a CORESET that includes one or more copies of the CORESET resource allocation.

8. The non-transitory computer readable medium of claim 7, wherein determining the RB set of the RB sets has the smallest number of available RBs comprises identifying a zeroth RB set of the RB sets.

9. The non-transitory computer readable medium of claim 7, wherein a size of a CORESET resource in a frequency domain monitoring occasion is equal to a size of a zeroth RB set.

* * * * *